(12) United States Patent
Franzén et al.

(10) Patent No.: US 8,029,601 B2
(45) Date of Patent: Oct. 4, 2011

(54) METHOD AND APPARATUS FOR SEPARATION OF PARTICLES FROM A FLOW OF GAS

(75) Inventors: Peter Franzén, Huddinge (SE); Claes Inge, Saltsjo-Duvnas (SE); Torgny Lagerstedt, Stockholm (SE)

(73) Assignee: 3nine AB (SE)

( * ) Notice: Subject to any disclaimer, the term of this patent is extended or adjusted under 35 U.S.C. 154(b) by 349 days.

(21) Appl. No.: 11/922,453

(22) PCT Filed: Jun. 27, 2006

(86) PCT No.: PCT/SE2006/050219
§ 371 (c)(1),
(2), (4) Date: Dec. 19, 2008

(87) PCT Pub. No.: WO2007/001202
PCT Pub. Date: Jan. 4, 2007

(65) Prior Publication Data
US 2009/0266231 A1     Oct. 29, 2009

(30) Foreign Application Priority Data
Jun. 27, 2005   (SE) ........................................ 0501495

(51) Int. Cl.
*B03C 3/10*  (2006.01)
*B03C 3/15*  (2006.01)
(52) U.S. Cl. ........................ 95/77; 95/78; 96/61; 96/94
(58) Field of Classification Search ................ 95/77, 78; 96/39–42, 94, 61
See application file for complete search history.

(56) References Cited

U.S. PATENT DOCUMENTS

| | | | | |
|---|---|---|---|---|
| 640,694 | A | * | 1/1900 | Marius ..................... 422/186.07 |
| 2,853,151 | A | * | 9/1958 | Guldemond ..................... 96/61 |
| 3,234,716 | A | * | 2/1966 | Sevin et al. ................ 210/360.1 |
| 3,492,790 | A | * | 2/1970 | Ebert ................................ 96/39 |
| 3,875,061 | A |  | 4/1975 | Palma |
| 3,890,103 | A |  | 6/1975 | Konishi |
| 4,093,432 | A | * | 6/1978 | Ahlrich ............................ 96/78 |
| 4,098,578 | A | * | 7/1978 | Stanton ........................ 422/182 |
| 4,718,923 | A |  | 1/1988 | Haag et al. |

(Continued)

FOREIGN PATENT DOCUMENTS

DE     29714203 U1    10/1997
(Continued)

OTHER PUBLICATIONS

"PCT Application No. PCT/SE2006/050219, International Search Report mailed Oct. 4, 2006", 5 pgs.

(Continued)

*Primary Examiner* — Richard L Chiesa
(74) *Attorney, Agent, or Firm* — Schwegman, Lundberg & Woessner, P.A.

(57) ABSTRACT

A method and apparatus for the separation of particles from a flow of gas, where both large, heavy and small, light particles are separated off from the gas by the combined effect of an electrostatic attraction force and a centrifugal force in a centrifugal separator of the type that comprises a rotor that has a plurality of adjacent surface elements with intermediate gas flow gaps and that is mounted in such a way that it can rotate in a surrounding casing, which casing has an inlet for unclean gas and an outlet for clean gas and an outlet for separated-off particles.

12 Claims, 5 Drawing Sheets

U.S. PATENT DOCUMENTS

| | | | |
|---|---|---|---|
| 5,224,604 A | | 7/1993 | Duczmal et al. |
| 5,380,355 A * | | 1/1995 | Brothers .......................... 96/64 |
| 5,428,220 A | | 6/1995 | Ehara |
| 6,203,600 B1 * | | 3/2001 | Loreth .............................. 96/40 |
| 6,663,695 B2 * | | 12/2003 | Ike et al. .......................... 96/52 |
| 7,510,599 B2 * | | 3/2009 | Brothier et al. .................. 96/29 |
| 7,704,300 B2 * | | 4/2010 | Szepessy .......................... 95/69 |
| 2008/0105127 A1 * | | 5/2008 | Brothier et al. .................. 96/19 |
| 2008/0264251 A1 | | 10/2008 | Szepessy |

FOREIGN PATENT DOCUMENTS

| | | | | |
|---|---|---|---|---|
| GB | 729612 | | 5/1955 | |
| JP | 48-041364 | | 6/1974 | |
| JP | 52-36371 A | * | 3/1977 | ....................... 96/94 |
| JP | 2-078454 A | | 3/1992 | |
| JP | 4-094712 A | | 3/1992 | |
| JP | 2001-276648 A2 | | 10/2001 | |
| JP | 2005-046761 A2 | | 2/2005 | |
| SE | 527934 C2 | | 7/2006 | |
| SU | 668715 | | 6/1979 | |
| WO | WO 01/36103 A1 | * | 5/2001 | |
| WO | WO 2005/087384 A1 | * | 9/2005 | |
| WO | WO-2005/119020 A1 | | 12/2005 | |

OTHER PUBLICATIONS

"PCT Application No. PCT/SE2006/050219, Written Opinion mailed Oct. 4, 2006", 4 pgs.

"Chinese Application Serial No. 200680015212.0, First Office Action mailed Dec. 18, 2009", (w/ English Translation), 9 pgs.

"European Application Serial No. 06748058.2, Supplementary European Search Report dated Feb. 24, 2011", 7 pgs.

Notice of Reasons for Rejection mailed Mar. 1, 2011 in corresponding Japanese Application Serial No. P2008-518093, (English Translation), 4 pgs.

* cited by examiner

METHOD AND APPARATUS FOR SEPARATION OF PARTICLES FROM A FLOW OF GAS

RELATED APPLICATIONS

This application is a nationalization under 35 U.S.C. 371 of PCT/SE2006/050219, filed Jun. 27, 2006 and published as WO 2007/001232 A1 on Jan. 4, 2007, which claimed priority under 35 U.S.C. 119 to Sweden Patent Application Serial No. 0501495-6, filed Jun. 27, 2005; which applications and publication are incorporated herein by reference and made a part hereof.

TECHNICAL FIELD

The present invention refers to a method for the separation of particles from a flow of gas. More specifically, the invention relates to a method for the separation of both very small, light particles and also larger, heavier particles from flows of gas. The invention also relates to an apparatus for carrying out such a method.

BACKGROUND ART

For the separation of particles from large flows of gas, various types of centrifugal separator are currently used. For example, WO 01/36103 and U.S. Pat. No. 3,234,716 describe centrifugal separators for cleaning gases containing particles, such as oil particles, dust, etc., where the separator comprises a rotor mounted in a stationary casing in such a way that it can rotate, with a stack of surface elements in the form of, for example, conical sedimentation plates (insert plates). Separators of this type are effective for the separation of particles within a wide range of particle sizes. This is due to the short sedimentation distances between the plate elements and the high centrifugal forces. This type of separator is suitable for handling large quantities of particles. However, in certain applications they can be less effective, for example for the separation of the very smallest and lightest particles in the flow of gas, for example particles smaller than approximately 1 µm. These extremely small and light particles are thus often able to pass through the rotor's plate stack without being deposited on the surface elements and on the inside of the surrounding casing, with the result that these particles pass out of the separator along with the gas, without being separated off.

In order to separate off extremely small and light particles from flows of gas, electrostatic filters or cleaners can be used, which, however, have limitations when it is a question of separating larger particles and handling larger quantities of particles.

In order to be able to separate off both very small, light particles and also larger, heavier particles from flows of gas, various types of electrostatic filter or cleaner have previously been proposed, using which it is possible to separate off the fine particles from the gas by means of a combination of electrostatic forces and centrifugal forces. For example, GB 729 612, U.S. Pat. Nos. 2,853,151 and 4,718,923 describe various types of such electrostatic separators, where the particles in the flow of gas are charged and at the same time the flow of gas is subjected to a cyclone effect in order to separate off small and large particles by means of the centrifugal forces. A disadvantage with these separators is that the charged surfaces, on which particles are deposited, are stationary and quickly become coated to such an extent that the electrostatic forces are ineffective. Accordingly, such separators cannot handle flows of gas with a high particle content.

DISCLOSURE OF THE INVENTION

An object of the present invention is to propose a method that improves the efficiency and capacity when separating off both large, heavy particles and also very small, light particles, either individually or in combination. In principle, this can be achieved according to the invention by the particles in the flow of gas being charged in an ionization step; by the flow of gas with the charged particles being caused to flow through a plurality of gaps between plate-shaped sedimentation surface elements on a rotor in a centrifugal separator, where an electrical field is generated by applying an electrical potential that is different to the potential of the particles across the adjacent sedimentation surface elements; by the particles being caused to be deposited on a face of the sedimentation surface elements during their passage through the gaps by means of at least an electrostatic attraction force; by the particles that are deposited on the sedimentation surface elements being caused to flow out towards the periphery of the sedimentation surface elements by the rotation of the rotor and from there to be thrown towards the inside of a casing surrounding the rotor; and by the particles that are trapped on the inside of the casing and the gas that is cleaned of particles being led out from the casing through separate outlets in the casing. By means of such a method, extremely small and light particles (smaller than approximately 1 µm), that are not able to be separated off using centrifugal force alone ("g-force separation"), are first caused to be deposited on the surface elements by electrostatic attraction forces, after which the accumulations of the particles on the surface elements can be thrown out towards the surrounding wall of the casing by the rotation of the rotor and are thereafter led out through the outlet for particles in the casing.

For the separation of both very small, light particles and heavier particles, it is particularly advantageous if the particles are caused to be deposited on a face of the sedimentation surface elements during their passage through the gaps by means of a simultaneous combined effect of a centrifugal force created by the rotation of the rotor and an electrostatic attraction force.

According to the invention, alternative apparatuses for carrying out this method are also proposed for both concurrent and counter-current separation.

Additional details and advantages of the invention will be apparent from the detailed description and with reference to the attached drawings.

MODES FOR CARRYING OUT THE INVENTION

Figure 1:
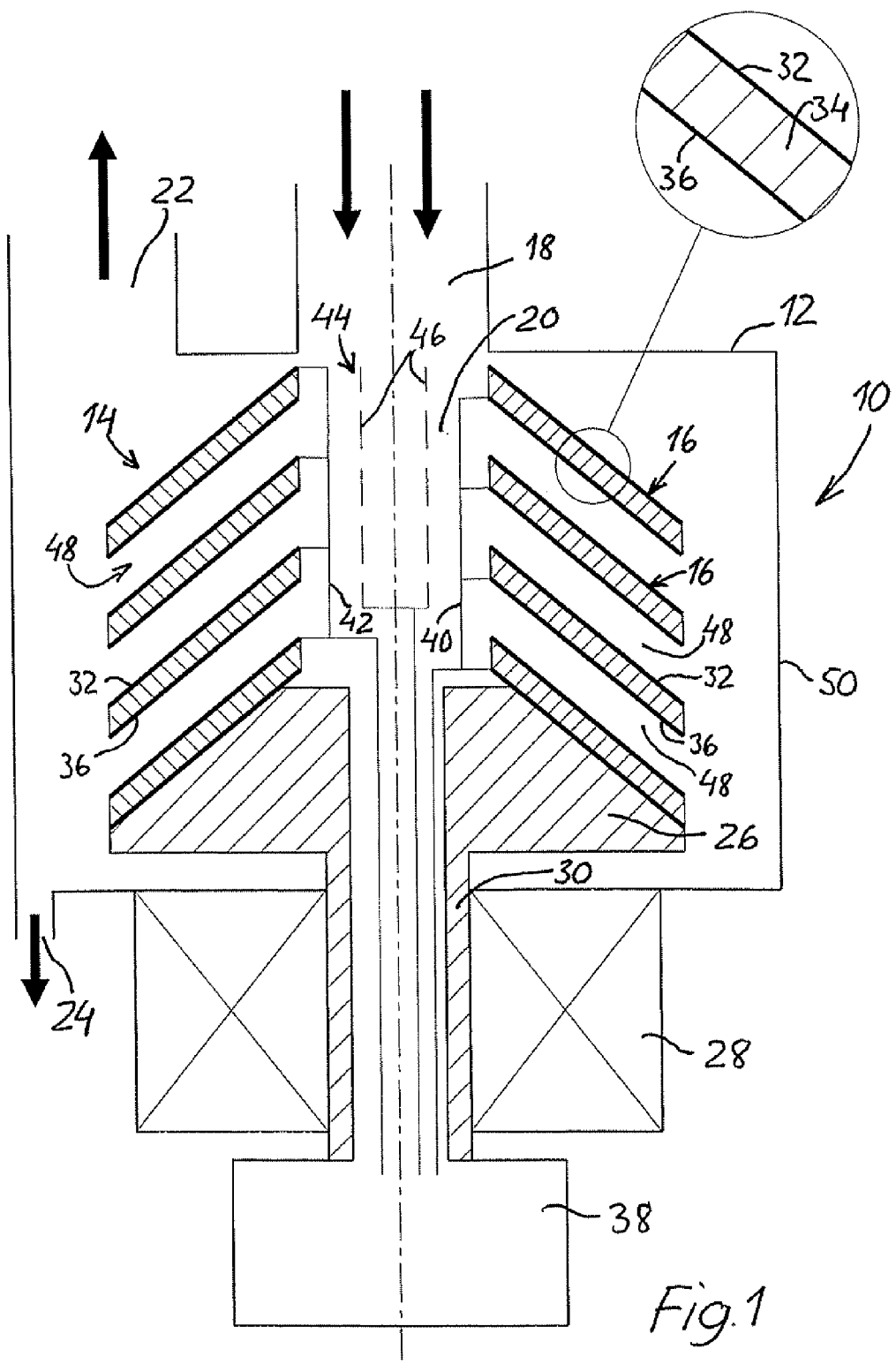
FIG. 1 shows schematically, in side view, a first embodiment of an electrostatic centrifugal separator according to the present invention with conical sedimentation plates.

In FIG. 1, a first embodiment of a centrifugal separator according to the invention is indicated in general by the reference numeral 10, which centrifugal separator is intended to separate off electrostatically-charged, solid and/or liquid particles in a flow of gas by means of the simultaneous, combined effect of electrostatic attraction forces and centrifugal forces. The separator 10 comprises a stationary casing 12, in which a rotor 14 is mounted in such a way that it can rotate, which rotor has a plurality of sedimentation surface elements mounted on it in the form of a stack of concentric, conical, plate-shaped elements, so-called insert plates 16, the construction of which will be described in greater detail below. The casing 12 has an inlet 18 for the gas that is to be cleaned. The inlet 18 opens out concentrically into a central inlet shaft 20 in the rotor 14. The casing 12 has, in addition, an outlet 22 for the gas that has been cleaned in the centrifugal separator 10, and an outlet 24 for the particles that have been separated off from the gas.

The rotor 14 has a lower end 26 upon which the conical insert plates 16 are stacked, which insert plates are held a small axial distance apart by means of spacers (not shown). Only four plates 16 are shown in the drawing, for the sake of clarity, and these are shown with an exaggerated thickness and at an exaggerated distance apart. The rotor 14 is driven by a drive unit, here exemplified by an electrical motor 28, via a shaft 30.

The conical insert plates 16 can be constructed of three layers, namely an outward-facing electrically-conductive surface layer 32, an inner, insulating intermediate layer 34 of a non-conductive material, and an inward-facing electrically-conductive surface layer 36. At least the inward-facing surface layers 36 are connected electrically to an electrical voltage source 38, via separate leads 40 that are shown schematically, or are alternatively connected to earth. The voltage source 38 can comprise an electrical generator, that generates a suitably high voltage for application to the inward-facing surface layers 36 of the plate elements by means of the rotation of the motor 28 and of the rotor 14, while the outward-facing surface layers 32 can be connected to earth via leads 42 or can have a potential of the same type as the particles, so that an electrical field is created between the opposing faces of the adjacent plate elements 16. Upstream of the conical insert plates 16, either somewhere in the inlet 18 (see FIG. 2) or, as shown in FIG. 1, inside the central inlet shaft 20 in the rotor 14, an ionization unit 44 is arranged for charging the particles in the flow of gas, before they are led in between the conical insert plates 16. The ionization unit 44 can, for example, comprise various arrangements of corona wires 46 or the like, which can be arranged in the inlet 18 or in the inlet shaft 20, or can be integrated with an electronic unit (not shown) in the voltage source 38 or with a completely separate electronic unit (not shown). The corona wires 46 can, for example, be arranged along the axis and can be in the form of a ring in the shaft 20. Alternatively, the corona wires 46 can be arranged as rings that are concentric with the inlet gaps between the adjacent insert plates 16 (not shown), and can be arranged to rotate together with the rotor 14. By means of the corona wires 46, the particles in the flow of gas can be given, for example, a negative potential, before they are led, together with the flow of gas, into the gaps 48 between the insert plates 16. The corona wires 46 can, for example, operate with a voltage of the order of −10 kV to −20 kV. The potential of the surface layers 36 can then, for example, be several kilovolts, for example approximately +5 kV.

The centrifugal separator 10 in the embodiment according to FIG. 1 works in principle in the following way:

A flow of gas containing both small, light and larger, heavier particles, that are to be separated off from the gas, is led into the central inlet shaft 20 of the separator's rotor 14 via the inlet 18. On its way into the shaft 20, upstream of this, or, as shown in the figure, in the inlet shaft 20 itself, the particles in the flow of gas are charged by means of an ionization of the particles by the corona wires 46 in the ionization unit 44. In addition, during the passage of the flow of gas through the gaps 48 between the insert plates 16, due to their charge potential, the small, light particles that are difficult to separate off by centrifugal force, are quickly deposited on and trapped on the surface layers 36 of the insert plates 16, that have an opposite or different charge potential. In the embodiment described here, the method utilized is concurrent separation, where the flow of gas passes from inside the rotor and outwards and, during their passage through the gaps 48, the particles are accumulated on the inward-facing surfaces 36 of the insert plates 16 by the combined effect of centrifugal forces and electrostatic forces and thereafter slide out towards the outer periphery of the insert plates and are then thrown towards the inside of the surrounding wall 50 of the casing, after which the particles trapped upon the wall can be caused to flow out from the casing 12 via the outlet 24 for particles in the bottom of the casing. The gas that has been cleaned of particles flows out from the casing 12 via the outlet 22 for gas.

By means of the separation method and the apparatus proposed according to the invention, it is thus possible, in one and the same centrifugal separator and at one and the same time, to separate off both larger, heavier and also extremely small, light particles from a flow of gas, in particular such small particles that would otherwise pass straight through the gaps 48 between the insert plates 16 and then pass out through the outlet 22 for gas along with the flow of gas. It can thus be ensured that the gas is extremely clean when it flows out. In addition, the apparatus is able to handle large quantities of particles.

It should be emphasized that the embodiment of the invention according to FIG. 1 can also be practicable for use in a counter-current gas cleaning method that is not shown in the drawing. In this, the flow of gas flows in the opposite direction, that is from the outlet 22 (now inlet) in the casing 12 shown in the figure, into the gaps 48 between the insert plates 16, radially inwards towards the central shaft 20 of the rotor 14 and thereafter out through the inlet 18 shown in the drawing, that now forms the outlet for the clean gas. The ionization and charging of the gas particles in the flow of gas can be carried out either directly before they are led into the casing 12 via the inlet 22 or by means of corona wires (not shown) that are either stationary or rotate in the same direction, placed directly outside the outer periphery of the plate elements 16. During the passage of the gas through the gaps 48, the particles are trapped on the inward-facing, charged surfaces 36 by the combined effect of the centrifugal forces and electrostatic forces and form clusters or accumulations that flow out towards the periphery of the plates 16 due to the centrifugal forces and are thrown towards the inside of the wall 50 of the casing, after which the particles that have been separated off are caused to flow out through the outlet 24 for particles.

Figure 2:
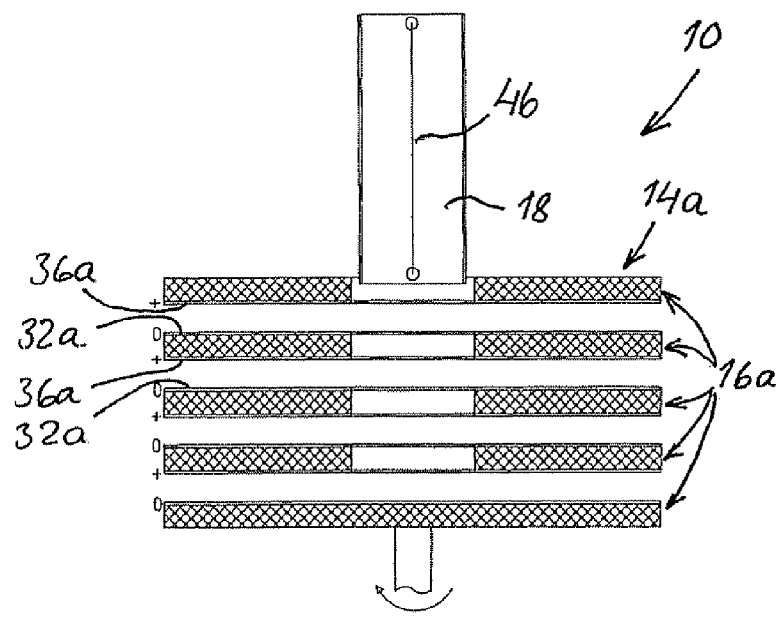
FIG. 2 shows schematically, in side view, a second embodiment of a rotor for an electrostatic centrifugal separator according to the present invention with flat, radial sedimentation plates.

For the separation of only extremely small and light particles, for example particles of less than approximately 1 μm, from a flow of gas, it is possible, as shown schematically in FIG. 2, to use an electrostatic centrifugal cleaner, with a rotor 14a that has plate-shaped elements 16a in the form of flat disks. The plates 16a do not need to have surfaces that are at an angle in relation to the centrifugal force, as is the case with the conical plate elements 16 in FIG. 1, as the g-force concerned does not have the required effect on the extremely small particles. These can thus be caused, by electrostatic attraction forces alone, to become attached to one 32a of the opposing faces 32a, 36a of the preferably rotating plate elements 16a that, in the case of concurrent separation, create a fan effect. The rotor 14a can alternatively be stationary and can be started up intermittently to throw the accumulation of particles out towards the inside of the surrounding casing (not shown) when large accumulations of particles have formed on the plate elements 16a, which accumulations of particles are then led out through an outlet for particles. In the embodiment in FIG. 2, the ionization of the particles in the gas upstream of the rotor 14a is carried out by one or more corona wires 46 arranged in the inlet 18.

Figure 3:
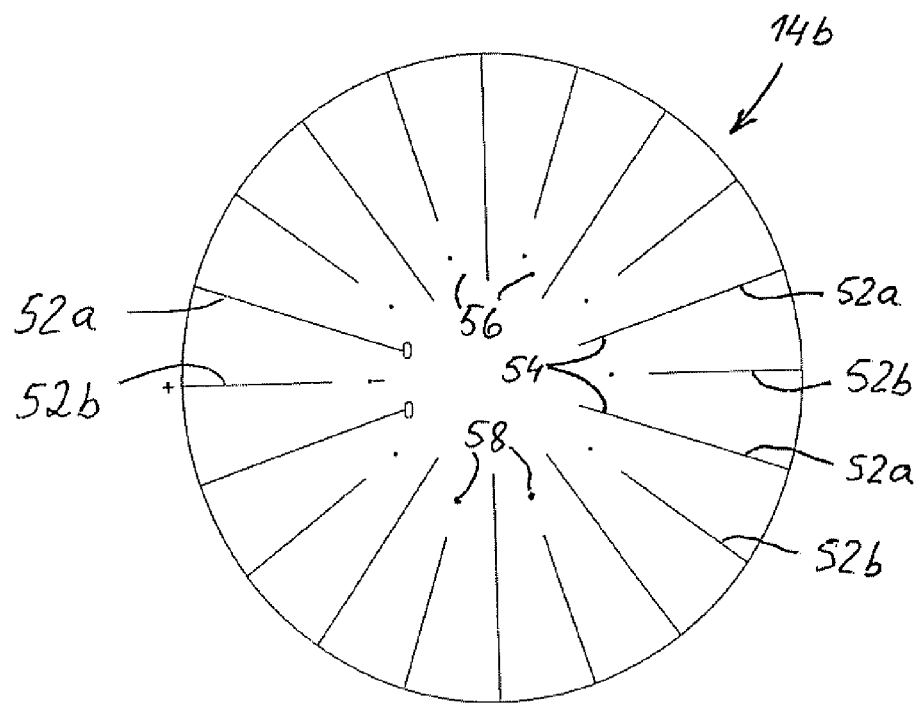
FIG. 3 shows schematically, in plan view, a third embodiment of a rotor for an electrostatic centrifugal separator according to the present invention with flat, axial sedimentation plates with ionization spaces that rotate in the same direction.

FIG. 3 shows schematically, in plan view, an alternative embodiment of the rotor 14b for the apparatus according to the invention, where the insert plates are constructed as flat, radially-directed plate elements 52a, 52b arranged along the axis of the shaft of the rotor. Every other plate element 52a has an inner section 54, so that an ionization space 56 is formed between these, in which the particles in the flow of gas to be cleaned that is flowing into the rotor can be charged by means of a corona wire 58 that is rotating the same direction and that is located in the respective space 56. The plate elements 52a can be connected to earth, while the plate elements 52b lying between the plate elements 52a can have a potential of, for example, approximately +5 kV. The corona wires 58 can, for example, have a potential of between approximately −10 kV and −20 kV. This embodiment is suitable for the separation of very small and light particles, upon which the application of g-forces has little effect. The rotor can therefore be stationary during the actual depositing of the particles, during which the particles are caused, as a result of electrostatic attraction forces, to become attached to one of the opposing faces of the stationary plate elements 52a, 52b. In a similar way as in the embodiment in FIG. 2, the rotor 14b can then be started in order to throw the accumulations of particles out towards the inside of the surrounding casing (not shown), from where they are then led out through an outlet for particles.

Figure 4:
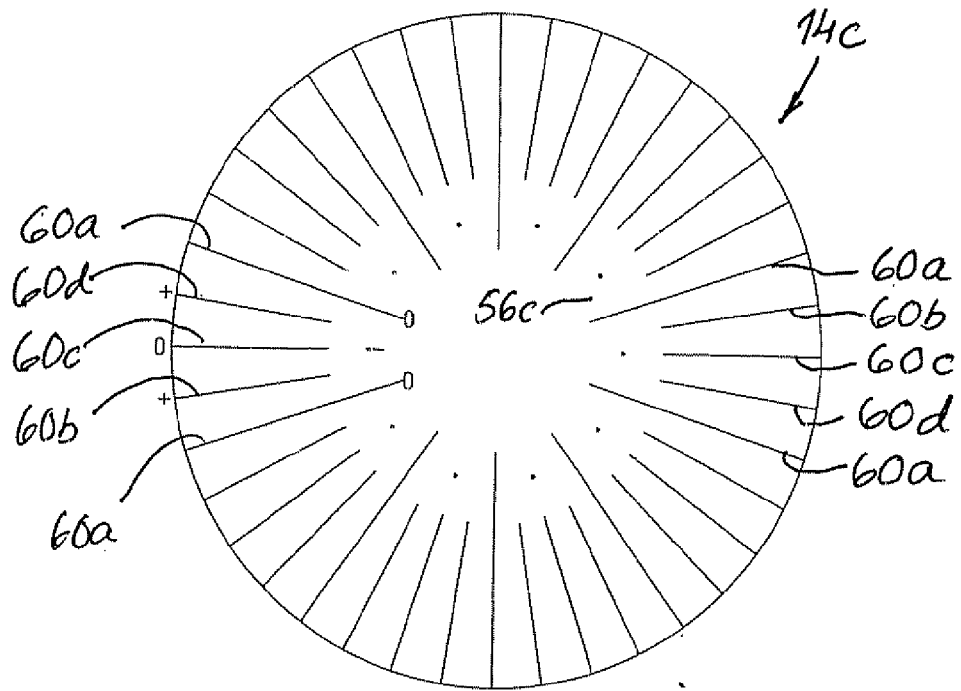
FIG. 4 shows schematically, in plan view, a fourth embodiment similar to the one in FIG. 3 but with several sedimentation gaps associated with each ionization space.

FIG. 4 shows a rotor embodiment similar to the one in FIG. 3, but where plate elements 60a in the rotor 14c, that have radial inner end sections forming the ionization space 56c, have three plate elements 60b-d between them, the middle one of which 60c is connected to earth, as are the plate elements 60a, while the plate elements 60b and 60d can have a potential of, for example, approximately +5 kV.

Figure 5:
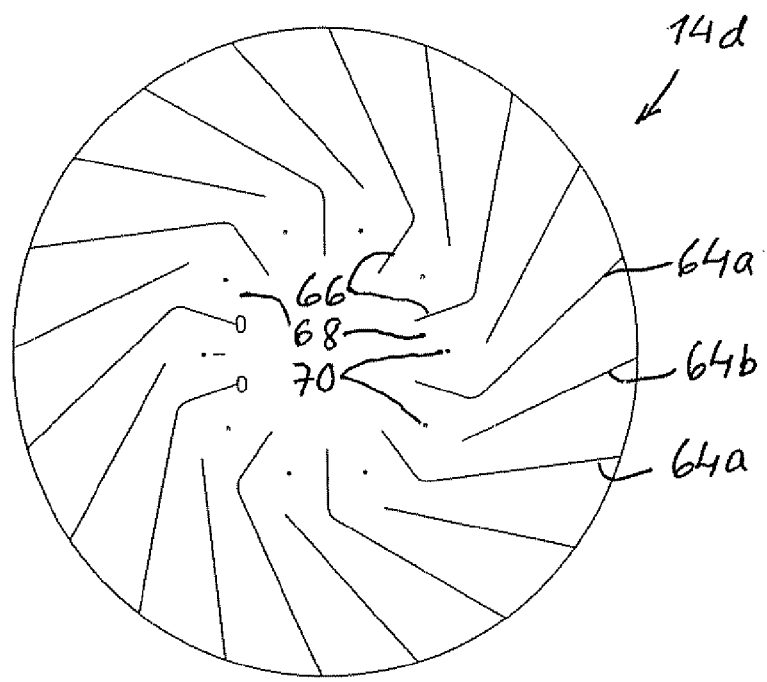
FIG. 5 shows schematically, in plan view, a fifth embodiment of a rotor for an electrostatic centrifugal separator according to the present invention with flat, axial, sedimentation plates that are at an angle in relation to the radius.

As shown in FIG. 5, the rotor 14d can alternatively have sedimentation plates constructed as plate elements 64a, 64b arranged in an axial direction along the shaft of the rotor, which plate elements are at an angle in relation to the radius in plan view. Every other plate element 64a can have an inner, radially-directed section 66, so that an ionization space 68 is formed between these, in which the particles in the flow of gas that is to be cleaned flowing into the rotor 14d can be charged by means of a corona wire 70 that rotates in the same direction and is located in the respective space 68. The plate elements 64a, 66 can be connected to earth, while the plate elements 64b located between these, that only have a tangential section, can have a potential of, for example, approximately +5 kV. The corona wires 70 can have, for example, a potential of approximately −10 to −20 kV. In this embodiment, where the plate elements 64a, 64b have parts that are at an angle in relation to the centrifugal force, both heavy and light particles can be trapped on the plate element sections by means of a combined effect of the electrostatic attraction forces and centrifugal forces.

Figure 6:
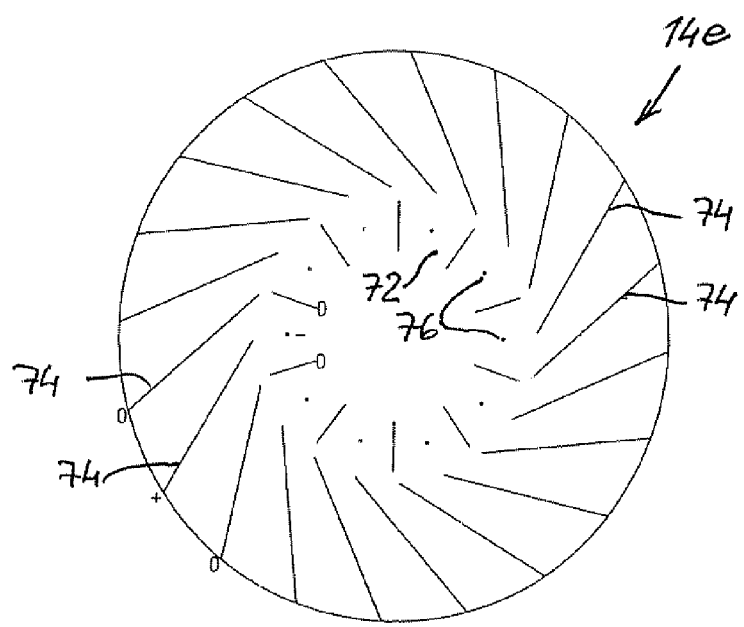
FIG. 6 shows schematically, in plan view, a sixth embodiment similar to the one in FIG. 5 but with stationary ionization spaces.

FIG. 6 shows schematically an embodiment of a rotor similar to the one in FIG. 5, but where the ionization spaces 72 are designed to be stationary in the central part of the rotor 14e, separated from the rotating, tangential plate elements 74. By this means, an ionization space is created that is less disruptive to the flow. Every other plate element 74 is connected to earth, while the elements lying between these are connected to positive potential. The corona wires 76 can, for example, be connected to a negative potential.

Figure 7:
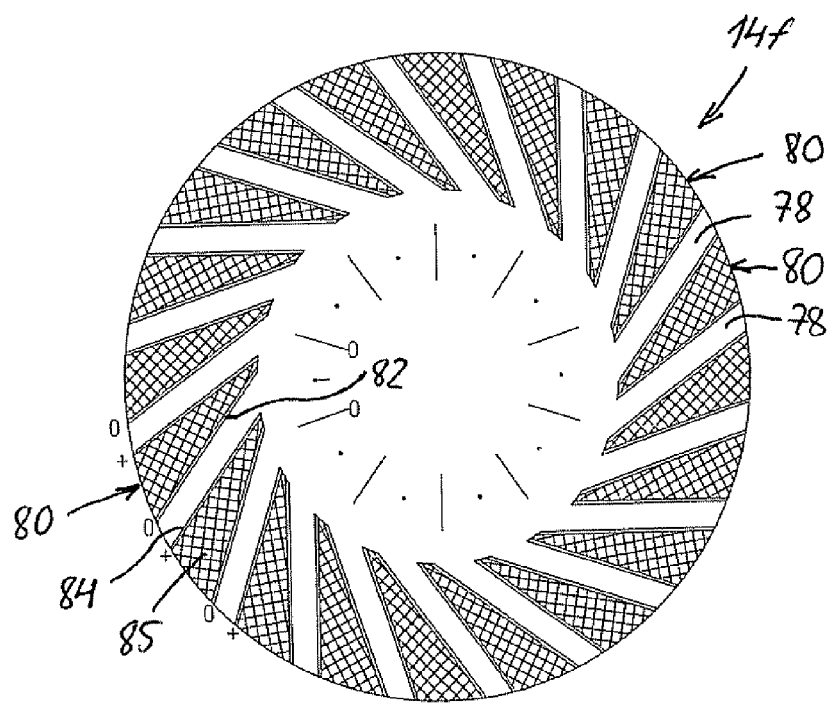
FIG. 7 shows schematically, in plan view, a seventh embodiment similar to the one in FIG. 6 but with parallel opposing surfaces of the sedimentation channels.

FIG. 7 shows schematically an embodiment of a rotor 14f, that differs from the one shown in FIG. 6 in that the flow gaps 78 between the angled plate elements 80 have parallel opposing faces 82 and 84, with the face 84 having a positive potential, while the opposing face 82 is connected to earth. By this means, an electrical field is created between the plate elements 80 that has a more uniform field strength. The plate elements 80 can be constructed of an insulating core 85 with electrically-conductive surface layers that form the faces 82 and 84.

Figure 8:
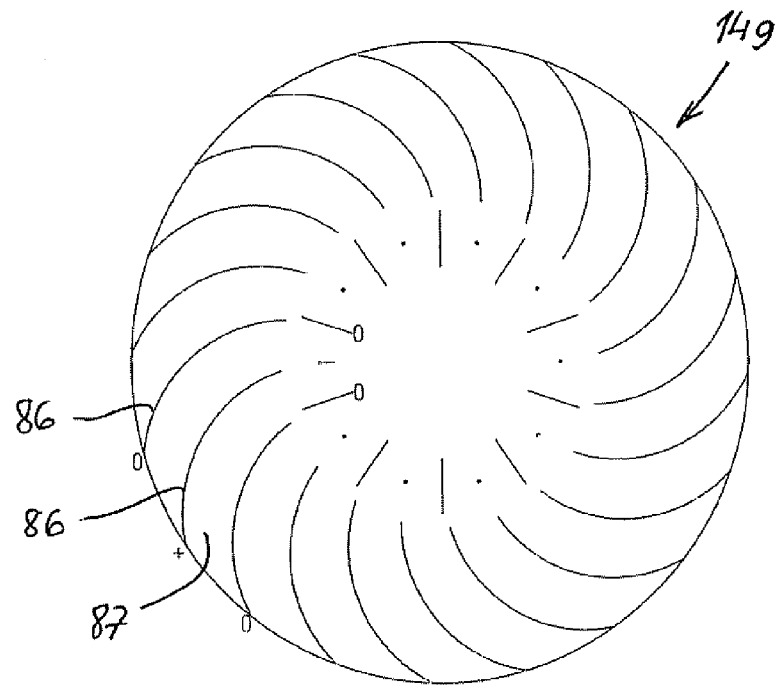
FIG. 8 shows schematically, in plan view, an eighth embodiment of a rotor for an electrostatic centrifugal separator according to the present invention with curved, axial, sedimentation plates.

FIG. 8 shows an embodiment of a rotor 14g that differs from the one shown in FIG. 6 in that the plate elements 86 are curved instead. Also by this means, flow gaps 87 can be obtained between the plate elements 86 that have an electrical field with an essentially uniform field strength.

Figure 9:
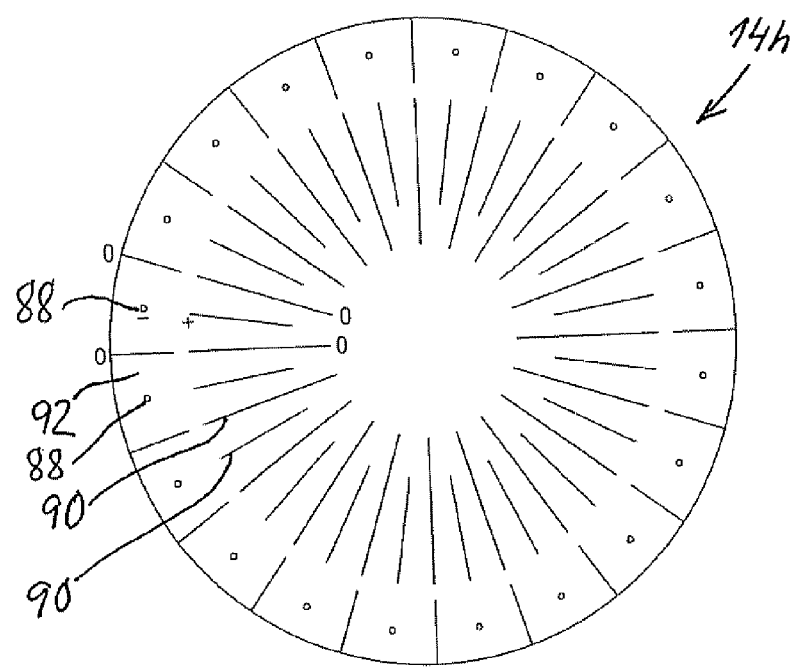
FIG. 9 shows schematically, in plan view, a ninth embodiment of a rotor for an electrostatic centrifugal separator according to the present invention for counter-current separation.

The embodiments of the invention shown in FIGS. 1-8 are intended for so-called concurrent separation, where the flow of gas with the particles flows from inside and outwards through plate-shaped sedimentation surface elements of the rotor, that is essentially in the same direction as the centrifugal force. It is, however, as pointed out above, possible within the framework of the present invention to modify all the embodiments to achieve a so-called counter-current separation, where the flow of gas flows in the opposite direction, that is from the outside and inwards towards the centre of the rotor and essentially counter to the direction of the centrifugal force. FIG. 9 shows an example of this. In this, corona wires 88 that are arranged in an axial direction are arranged radially outside the outer periphery of the sedimentation surface elements, here exemplified as flat, radially-oriented plate elements 90, which are alternately connected to earth and to a potential, for example a positive potential, and where, in a similar way as before, the corona wires 88 extend through ionization spaces 92 located upstream, which ionization spaces can be stationary in a surrounding casing (not shown). The ionization spaces 92 can, of course, also rotate in the same direction. The embodiment of the rotor 14h according to FIG. 9 has completely radial, flat plate elements 90 suitable primarily for purely electrostatic separation of very small, light particles, where the accumulations of deposited particles on the plate elements 90 can be thrown off from these towards the surrounding casing as a result of the rotation of the rotor 14h. Corresponding counter-current separation concepts are also applicable for the other embodiments described above.

Although, in the embodiments described above, the corona wires can be said to be connected to a negative voltage potential while the sedimentation surface elements are connected to a positive voltage potential, it should be noted that it is possible for the polarity to be reversed. In addition, it is possible, instead of earthing the plate elements or the faces of the plates that are not intended to trap the particles, to apply a voltage of the same type as that applied to the sedimentation surface but with different strengths of the potential. It is also possible to charge the sedimentation surfaces with a voltage of the same type as that with which the particles are charged, but with different strengths of the potential.

It should be noted, in addition, that the apparatus according to the embodiments in FIGS. 1 and 5-8 can also make it possible to carry out a classification of different fragments of a particular material that is to be found in a flow of gas. By regulating the rate of flow of the gas through the separator and/or regulating the charge potentials of the particles and of the inward-facing surfaces of the plate elements that are at an angle in relation to the centrifugal force and, if necessary, by regulating the speed of the rotor in a suitable way, depending upon the specific gravities of the particles that are to be separated off, it is possible, for example, to control the separation in such a way that only fractions of a particular maximal density are separated off, while other particles of a lower density, according to requirements, are allowed to pass out from the casing 12 along with the gas. It should also be noted, that the casing 12 can also be arranged to rotate together with the rotor 14 in order to reduce the turbulence in the space between the inner wall of the casing and the rotor 14.

It is, in addition, expedient to provide the embodiments described above with flushing devices (not shown) for flushing the plate elements with liquid at regular intervals. For example, for this purpose it would be possible to use flushing devices of the type shown and described in SE 526 815 C2 (WO2005087384).

It should be noted that the gap between the plate elements and the wall elements, shown in FIGS. 6-9, that delimits the ionization spaces, can also symbolize an electrical separation between these elements, for which reason, in these cases, the ionization spaces can be considered to be able to rotate together with the plate elements.

The invention claimed is:

1. A method for the separation of particles from a flow of gas, comprising:
    charging the particles in the flow of gas in an ionization step after which the flow of gas with the charged particles is caused to flow through a plurality of gaps between plate-shaped sedimentation surface elements of a rotating rotor in a centrifugal separator,
    wherein an electric voltage of a first potential is applied to a one of two opposite surface layers of adjacent sedimentation surface elements, said first potential differing from a second potential of the other, opposite surface layer, so that the particles passing through the gaps are caused to deposit on an inwardly facing surface layer of the sedimentation surface elements by a combined action of centrifugal forces and electrostatic attraction forces,
    after which the particles deposited on the sedimentation surface elements are caused to flow out towards the periphery of the sedimentation surface elements and from there thrown towards the inside of a surrounding, stationary casing, the particles that have been trapped on the inside of the casing and the gas that have been cleaned of particles are led out from the casing through separate outlets in the casing.

2. The method as claimed in claim 1, wherein the voltage that is required for charging the particles and the surface layers of the rotor with the required electrical potential, is generated by a generator/electronic unit that rotates together with the rotor of the centrifugal separator.

3. An apparatus for concurrent separation of particles from a flow of gas, comprising:
    a unit for charging the particles in the flow of gas in an ionization phase; and
    a sedimentation unit on which the particles in the flow of gas can be deposited,
    wherein the unit for sedimentation of the electrically charged particles comprises a rotor of a centrifugal separator, said rotor having a plurality of adjacent surface elements with intermediate gas flow gaps and being rotatably supported in a surrounding stationary casing, said surface elements delimit a central inlet shaft connected to an inlet for unclean gas, that is in communication with the flow gaps between the surface elements and with a space in the casing surrounding the rotor and which surface element being provided with at least one electrically leading surface layer,
    wherein an electronic unit is configured for applying different electric potentials to the opposite surface layers of the surface elements, so that the charged particles passing through the gaps are captured on an inwardly facing surface layer of the surface elements by a combined action of centrifugal forces and electrostatic attraction forces,
    wherein the particles that have been captured on the inside of the surrounding casing can be led out from the casing via an outlet for particles, while the gas that has been cleaned of particles can flow out from the casing via an outlet for gas.

4. The apparatus as claimed in claim 3, wherein the electronic unit comprises a generator that can rotate together with the rotor.

5. The apparatus as claimed in claim 3, wherein the charging unit comprises one or more corona wires arranged in the rotor shaft.

6. The apparatus as claimed in claim 3, wherein the surface elements have a frustoconical shape.

7. The apparatus as claimed in claim 3, wherein the surface elements have the shape of circumferentially curved, axially-oriented elements.

8. An apparatus for the counter-current separation of particles from a flow of gas, comprising:
    a unit for charging the particles in the flow of gas by ionization; and
    a sedimentation unit provided with an inlet and located downstream of the charging unit and on which the particles in the flow of gas can be deposited,
    wherein the unit for sedimentation of the electrically charged particles comprises a rotor of a centrifugal separator, said rotor having a plurality of adjacent surface elements with intermediate gas flow gaps and being rotatably supported in a surrounding stationary casing, said surface elements delimit a central shaft of the rotor connected to an outlet for cleaned gas and communicating with the flow gaps between the surface elements and with a space in the casing surrounding the rotor, and which surface elements being provided with at least one electrically leading surface layer, wherein an electronic unit being configured for applying different electric potentials to the opposite surface layers of the surface elements, so that the charged particles passing through the gaps are captured on an inwardly facing surface layer by a combined action of centrifugal forces and electrostatic attraction forces, whereupon the particles that have been captured on an inside of the surrounding casing can be led out from the casing via an outlet for particles.

9. The apparatus as claimed in claim 8, wherein the electronic unit comprises a generator that can rotate together with the rotor.

10. The apparatus as claimed in claim 8, wherein the charging unit comprises one or more corona wires arranged in the rotor shaft.

11. The apparatus as claimed in claim 8, wherein the surface elements have a frustoconical shape.

12. The apparatus as claimed in claim 8, wherein the surface elements have the shape of circumferentially curved, axially-oriented elements.

* * * * *